(12) United States Patent
Lu

(10) Patent No.: US 7,856,622 B2
(45) Date of Patent: Dec. 21, 2010

(54) COMPUTER PROGRAM RUNTIME BOTTLENECK DIAGNOSTIC METHOD AND SYSTEM

(75) Inventor: Ying-Chih Lu, Taipei (TW)

(73) Assignee: Inventec Corporation, Taipei (TW)

( * ) Notice: Subject to any disclaimer, the term of this patent is extended or adjusted under 35 U.S.C. 154(b) by 1303 days.

(21) Appl. No.: 11/391,789

(22) Filed: Mar. 28, 2006

(65) Prior Publication Data

US 2007/0234122 A1 Oct. 4, 2007

(51) Int. Cl.
*G06F 9/45* (2006.01)
(52) U.S. Cl. ..................................... 717/127
(58) Field of Classification Search .............. 717/127
See application file for complete search history.

(56) References Cited

U.S. PATENT DOCUMENTS 6,438,512 B1* 8/2002 Miller ......................... 702/186
6,970,805 B1* 11/2005 Bierma et al. ............... 702/182
7,328,433 B2* 2/2008 Tian et al. ................... 717/149
2005/0086652 A1* 4/2005 Tian et al. ................... 717/151

* cited by examiner

*Primary Examiner*—John Chavis
(74) *Attorney, Agent, or Firm*—Muncy, Geissler, Olds & Lowe, PLLC

(57) ABSTRACT

A computer program runtime bottleneck diagnostic method and system is proposed, which is designed for use in conjunction with a computer platform for providing a BIOS (Basic Input/Output System) POST (Power On Self Test) runtime bottleneck diagnostic function, which is characterized by the capability of recording the runtime length of each of the constituent code modules of the BIOS POST routine during runtime such that a diagnostic report in electronic form can be generate to show which one of the constituent code modules of the BIOS POST routine is most time-consuming during runtime to allow BIOS POST program developers to make modifications to the code to make it more optimized and thus more efficient to run with a reduced runtime length. This feature allows the computer platforms with the optimized BIOS POST routine to have a faster startup time and thus more competitive on the market.

4 Claims, 2 Drawing Sheets

COMPUTER PROGRAM RUNTIME BOTTLENECK DIAGNOSTIC METHOD AND SYSTEM

BACKGROUND OF THE INVENTION

1. Field of the Invention

This invention relates to information technology (IT), and more particularly, to a computer program runtime bottleneck diagnostic method and system which is designed for use in conjunction with a computer platform that runs a computer program, such as a BIOS (Basic Input/Output System) POST (Power On Self Test) routine, for providing the BIOS POST routine with a runtime bottleneck diagnostic function that allows the user to find the runtime bottleneck of the BIOS POST routine, i.e., the most time-consuming code module in the BIOS POST routine, so that the BIOS POST program developers can modify the bottleneck-causing code module to make the BIOS POST routine more efficient to run.

2. Description of Related Art

POST (Power On Self Test) is a series of built-in diagnostic routines performed by the BIOS (Basic Input/Output System) in a computer platform at startup after powered on. The purpose of POST is to test the hardware components of the computer platform to check whether they can function normally after the operating system is loaded.

Since the BIOS POST routine is executed at the startup of the computer platform right after power-on, its efficiency is an important factor in the performance evaluation of the computer platform. In other words, if a POST's overall runtime length is long, then it will let the user wait for a very long while until the computer platform can be operated. On the other hand, if the POST runs fast, the computer platform will be operable soon after the user turns it on. For this sake, in the BIOS POST program development, it is required that the overall runtime length of a BIOS POST routine be optimized to the minimum. In view of this requirement, there exists a need in the computer industry for a BIOS POST runtime bottleneck diagnostic tool that can help BIOS POST program developers to find the runtime bottleneck of a BIOS POST routine.

SUMMARY OF THE INVENTION

It is therefore an objective of this invention to provide a computer program runtime bottleneck diagnostic method and system which can help BIOS POST program developers to find the runtime bottleneck of a BIOS POST routine for the purpose of modifying the BIOS POST routine to make it more efficient to run during operation.

The computer program runtime bottleneck diagnostic method and system according to the invention is designed for use in conjunction with a computer platform that runs a computer program, such as a BIOS POST routine, for providing the BIOS POST routine with a runtime bottleneck diagnostic function that allows the user to find the runtime bottleneck of the BIOS POST routine, i.e., the most time-consuming code module in the BIOS POST routine, so that the BIOS POST program developers can modify the bottleneck-causing code module to make the BIOS POST routine more efficient to run.

In conception, the computer program runtime bottleneck diagnostic method according to the invention comprises: (1) responding to a runtime execution event of the computer program by issuing a runtime-length recording enable message; (2) responding to the runtime-length recording enable message by recording the runtime length of each of the code modules of the computer program during runtime execution; and (3) after the completion of the execution of the computer program, generating a diagnostic report in electronic form which shows the runtime length of each of the code modules of the computer program in human-readable format.

In architecture, the computer program runtime bottleneck diagnostic system according to the invention comprises: (A) a runtime execution responding module, which is capable of responding to a runtime execution event of the computer program by issuing a runtime-length recording enable message; (B) a runtime length recording module, which is capable of responding to the runtime-length recording enable message from the runtime execution responding module by recording the runtime length of each of the code modules of the computer program during runtime execution; and (C) a diagnostic report generating module, which is capable of being activated after the completion of the execution of the computer program by generating a diagnostic report in electronic form which shows the runtime length of each of the code modules of the computer program in human-readable format.

The computer program runtime bottleneck diagnostic method and system according to the invention is characterized by the capability of recording the runtime length of each of the constituent code modules of the BIOS POST routine during runtime such that a diagnostic report in electronic form can be generate to show the runtime length data to the BIOS POST program developers, thereby allowing the BIOS POST program developers to learn which one of the constituent code modules of the BIOS POST routine is most time-consuming during runtime and make modifications to the code to make it more optimized and thus more efficient to run with a reduced runtime length. This feature allows the computer platforms with the optimized BIOS POST routine to have a faster startup time and thus more competitive on the market.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The computer program runtime bottleneck diagnostic method and system according to the invention is disclosed in full details by way of preferred embodiments in the following with reference to the accompanying drawings.

Figure 1:
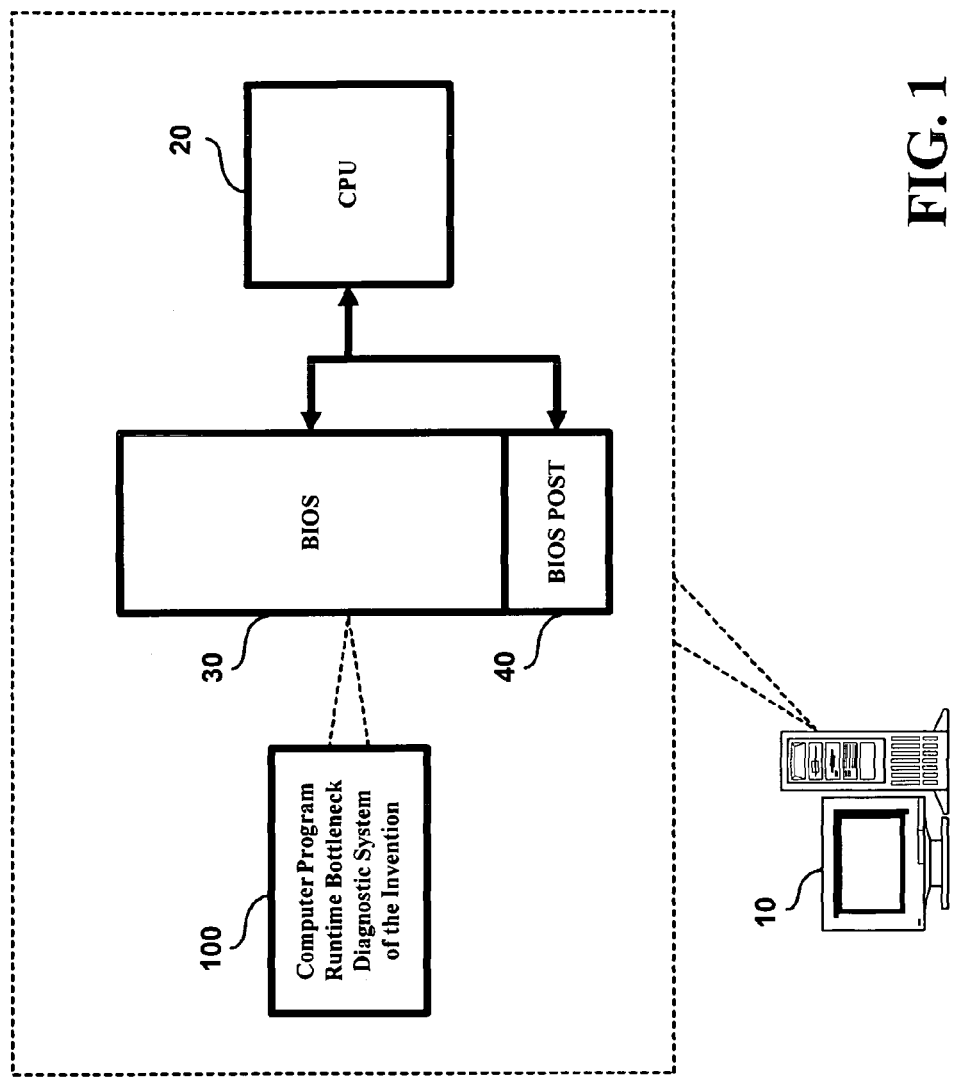
FIG. 1 is a schematic diagram showing the application of the computer program runtime bottleneck diagnostic system of the invention with a computer platform.

FIG. 1 is a schematic diagram showing the application of the computer program runtime bottleneck diagnostic system according to the invention (which is here encapsulated in a block indicated by the reference numeral 100). As shown, the computer program runtime bottleneck diagnostic system of the invention 100 is designed for use in conjunction with a computer platform 10, such as a network server, a desktop computer, or a notebook computer, that is equipped with a CPU (Central Processing Unit) 20 and a startup control unit 30; where the startup control unit 40 is for example a BIOS (Basic Input/Output System) module whose firmware program code includes a POST (Power On Self Test) routine.

In actual operation, the computer program runtime bottleneck diagnostic system of the invention 100 is capable of providing the BIOS POST routine 40 with a runtime bottleneck diagnostic function that can help the user to find the bottleneck of the BIOS POST routine 40 during runtime, i.e., the most time-consuming code module(s) in the BIOS POST routine 40, so that the BIOS POST program developers can modify the bottleneck code module(s) to make the BIOS POST routine 40 more efficient to run at startup of the computer platform 10.

Figure 2:
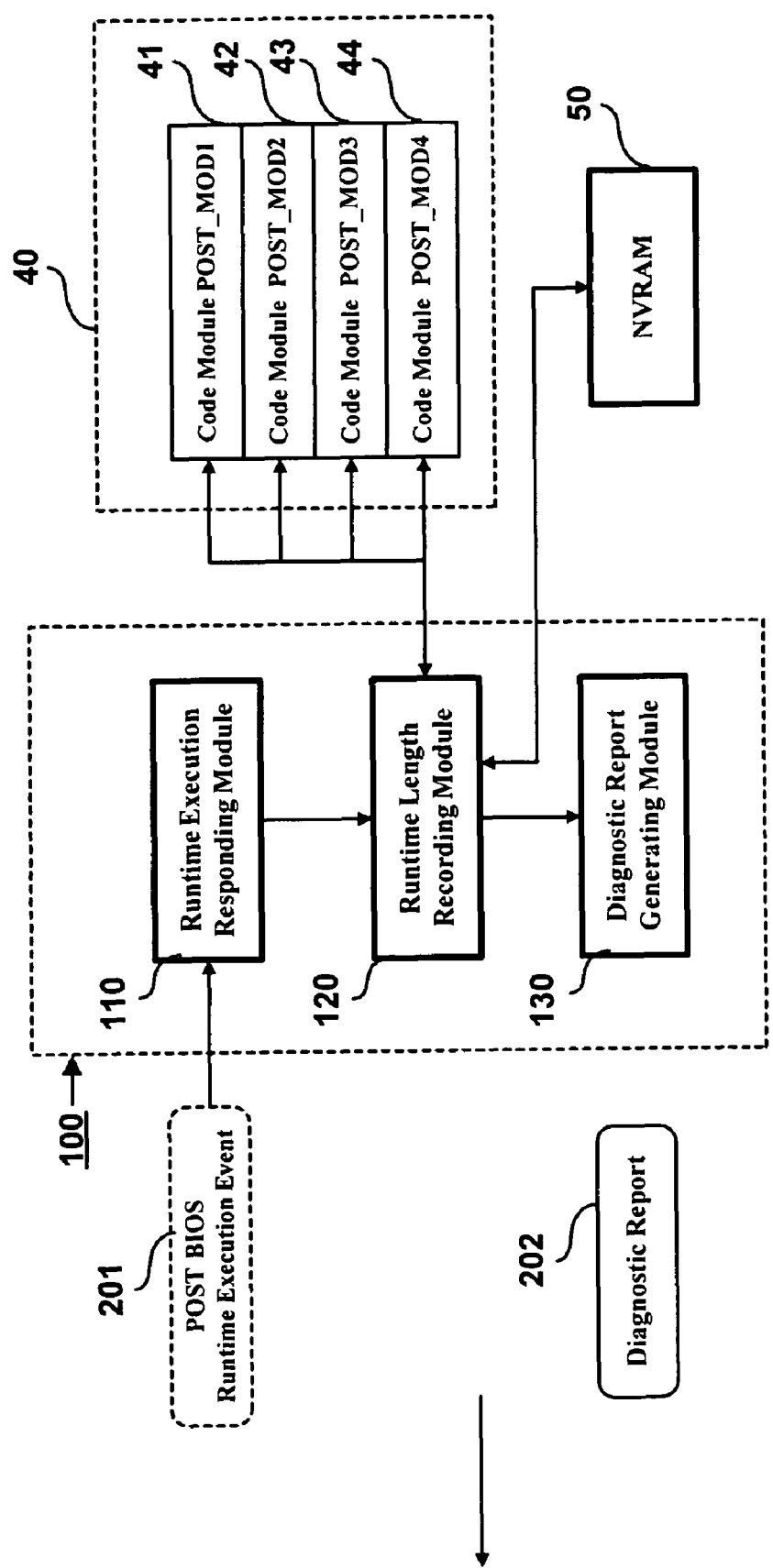
FIG. 2 is a schematic diagram showing an object-oriented component model of the computer program runtime bottleneck diagnostic system of the invention.

As shown in FIG. 2, in architecture, the computer program runtime bottleneck diagnostic system of the invention 100 is based on an object-oriented component model which comprises: (A) a runtime execution responding module 110; (B) a runtime length recording module 110; and (C) a diagnostic report generating module 130. In practical implementation, the computer program runtime bottleneck diagnostic system of the invention 100 can be fully realized by computer code and integrated as an add-on firmware module to the BIOS (Basic Input/Output System) of the computer platform 10, such that the computer code can be executed by the CPU 20 to provide the BIOS POST routine 40 with a runtime bottleneck diagnostic function.

Firstly, the respective attributes and behaviors of these constituent components 110, 120, 130 of the computer program runtime bottleneck diagnostic system of the invention 100 are described in details in the following.

The runtime execution responding module 110 is capable of responding to a POST BIOS runtime execution event 201 (i.e., when the BIOS POST routine 40 is being executed during runtime at startup of the computer platform 10) by issuing a runtime-length recording enable message to the runtime length recording module 120. In practical implementation, for example, since BIOS POST routine 40 is executed right after the power-on of the computer platform 10, the user can selectively set the computer program runtime bottleneck diagnostic system of the invention 100 to disabled state or enabled state by using the BIOS setup utility of BIOS module 30 that can be user-set to be displayed at startup of the computer platform 10.

The runtime length recording module 120 is capable of responding to the runtime-length recording enable message from the runtime execution responding module 110 by recording the runtime length of each of the constituent code modules 41, 42, 43, 44 of the BIOS POST routine 40 during runtime execution. In practical implementation, for example, the runtime length recording module 120 utilizes a built-in timestamp function of BIOS to record the runtime length. Further, the use of ACPI (Advanced Configuration and Power Interface) driver's timer function can allow the precision of the recorded runtime length to the level of μs (microsecond). During runtime when the BIOS POST routine 40 is being executed, the runtime length recording module 120 is capable of recording the start time $T_{start}$ of the execution of each of the code modules 41, 42, 43, 44 thereof, and further capable of recording the ending time $T_{end}$ thereof. Consequently, the runtime length T of each of the code modules 41, 42, 43, 44 can be determined as $T=T_{end}-T_{start}$. If any one of the code modules 41, 42, 43, 44 is further composed of several subroutines, then the runtime length recording module 120 is also capable of recording the runtime length of each of the subroutines.

The diagnostic report generating module 130 is capable of being activated at the completion of the execution of the BIOS POST routine 40 by generating a diagnostic report 202 in electronic form, which shows the runtime length of each of the code modules 41, 42, 43, 44 of the BIOS POST routine 40 in human-readable format. In practical implementation, for example, the diagnostic report 202 is an electronic file in text format (TXT). Further, the listing of the code modules 41, 42, 43, 44 in the diagnostic report 202 can be arranged in a decreasing order of runtime length, such that the most time-consuming code module is listed at the topmost position.

The following is a detailed description of a practical application example of the computer program runtime bottleneck diagnostic system of the invention 100 during actual operation. In this application example, it is assumed that the computer program 40 is a BIOS POST routine which is composed of 4 code modules 41, 42, 43, 44, respectively represented by POST_MOD1, POST_MOD2, POST_MOD3, and POST_MOD4. These code modules 41, 42, 43, 44 can be, for example, BIOS POST Check Point, SMI handler, IRQ0-IRQ15 HW ISR (Hardware Interrupt Service Routine), and timestamp utility of other type of HW ISR, to name a few.

Referring to FIG. 1 together with FIG. 2, after a BIOS POST routine 40 is developed by BIOS POST program developers and runs on the computer platform 10, if the user is unsatisfied with the POST performance that makes the computer platform 10 too slow to be booted at startup, the user can then activate the computer program runtime bottleneck diagnostic system of the invention 100 to diagnose the problem. The activation can be achieved by using the setup utility of the BIOS module 30 at the startup to set the computer program runtime bottleneck diagnostic system of the invention 100 to enabled state. After this, when the BIOS POST routine 40 is started to run (i.e., a BIOS POST execution event 201 occurs), it will cause the runtime execution responding module 110 in the computer program runtime bottleneck diagnostic system of the invention 100 to respond by issuing a runtime-length recording enable message to the runtime length recording module 120, thereby activating the runtime length recording module 120 to utilize timestamp function to record the respective runtime lengths $T_1, T_2, T_3, T_4$ of the code modules POST_MOD1, POST_MOD2, POST_MOD3, and POST_MOD4 41, 42, 43, 44 of the BIOS POST routine 40 during runtime execution. The recorded runtime length data are then stored to an NVRAM (Non-Volatile Random-Access Memory) unit 50, such as a flash memory module (Flash ROM). After the execution of the BIOS POST routine 40 is completed, the diagnostic report generating module 130 is activated to generate a diagnostic report 202 in electronic form, which retrieves the runtime length data stored in the NVRAM unit 50 and then compiles them into a listing that shows the runtime length $T_1, T_2, T_3, T_4$ of each of the code modules POST_MOD1, POST_MOD2, POST_MOD3, and POST_MOD4 41, 42, 43, 44 of the BIOS POST routine 40 during runtime execution.

By browsing the diagnostic report 202, the BIOS POST program developers can learn which one of the constituent code modules POST_MOD1, POST_MOD2, POST_MOD3, POST_MOD4 41, 42, 43, 44 of the BIOS POST routine 40 is most time-consuming during runtime and try to make modifications to that code module to make it more efficient to run during runtime. For example, if the third code module POST_MOD3 43 is most time-consuming, then the BIOS POST program developers can review its logics and rewrite the code to make it more optimized and thus more efficient to run with a reduced runtime length during execution.

In conclusion, the invention provides a computer program runtime bottleneck diagnostic method and system for providing a computer program, such as a BIOS POST routine, with a runtime bottleneck diagnostic function, which is characterized by the capability of recording the runtime length of each of the constituent code modules of the BIOS POST routine during runtime such that a diagnostic report in electronic form can be generate to show the runtime length data to the BIOS POST program developers, thereby allowing the BIOS POST program developers to learn which one of the constituent code modules of the BIOS POST routine is most time-consuming during runtime and make modifications to the code to make it more optimized and thus more efficient to run with a reduced runtime length. This feature allows the computer platforms with the optimized BIOS POST routine to have a faster startup time and thus more competitive on the market. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A computer program runtime bottleneck diagnostic method for use on a computer platform that runs a computer program of a BIOS (Basic Input/Output System) POST (Power On Self Test) routine composed of a number of code modules for providing the computer program with a runtime bottleneck diagnostic function, which comprises:

responding to a runtime execution event of the computer program by issuing a runtime-length recording enable message;

responding to the runtime-length recording enable message by recording the runtime length of each of the code modules of the computer program during runtime execution; and after the completion of the execution of the computer program, generating a diagnostic report in electronic form which shows the runtime length of each of the code modules of the computer program in human-readable format, wherein recording the runtime length of each of the code modules of the computer program during runtime execution further comprises:

recording a start time of the execution of each of the code modules of the computer program;

recording an ending time of the execution of each of the code modules of the computer program; and determining the runtime length of the execution of each of the code modules of the computer program by subtracting the start time from the ending time.

2. The computer program runtime bottleneck diagnostic method of claim 1, wherein the computer platform is a network server.

3. The computer program runtime bottleneck diagnostic method of claim 1, wherein the computer platform is a desktop computer.

4. The computer program runtime bottleneck diagnostic method of claim 1, wherein the computer platform is a notebook computer.

* * * * *